(12) United States Patent
Tokarczyk et al.

(10) Patent No.: US 11,953,908 B2
(45) Date of Patent: Apr. 9, 2024

(54) DEPLOYABLE SAFETY FENCE FOR MOBILE ROBOTS

(71) Applicant: Google LLC, Mountain View, CA (US)

(72) Inventors: Zack Tokarczyk, Bothell, WA (US); Nathanael Arling Worden, Mill Creek, WA (US)

(73) Assignee: Google LLC, Mountain View, CA (US)

( * ) Notice: Subject to any disclaimer, the term of this patent is extended or adjusted under 35 U.S.C. 154(b) by 276 days.

(21) Appl. No.: 17/499,162

(22) Filed: Oct. 12, 2021

(65) Prior Publication Data

US 2023/0110358 A1 Apr. 13, 2023

(51) Int. Cl.
| B65G 1/137 | (2006.01) |
| B25J 9/16 | (2006.01) |
| G05D 1/00 | (2006.01) |

(52) U.S. Cl.
CPC .......... *G05D 1/0214* (2013.01); *B25J 9/1666* (2013.01); *G05D 1/0236* (2013.01); *G05B 2219/39082* (2013.01)

(58) Field of Classification Search
CPC ... G05D 1/0214; G05D 1/0236; B25J 9/1666; G05B 2219/39082; G05B 19/41895; G05B 2219/40202

See application file for complete search history.

(56) References Cited

U.S. PATENT DOCUMENTS

| 6,690,134 | B1 | 2/2004 | Jones et al. |
| 10,442,083 | B2 | 10/2019 | Wolowelsky et al. |
| 10,482,321 | B2 | 11/2019 | Kusens |
| 10,583,561 | B2 | 3/2020 | Suvarna et al. |
| 11,014,238 | B2 | 5/2021 | Paschall, II et al. |
| 2013/0178980 | A1 | 7/2013 | Chemouny et al. |
| 2020/0376689 | A1 | 12/2020 | Rembisz et al. |
| 2021/0101748 | A1* | 4/2021 | Helsel ................ G06Q 50/28 |

FOREIGN PATENT DOCUMENTS

| CN | 105710888 B | 4/2018 |
| CN | 108908331 A | 11/2018 |
| CN | 110462540 A | 11/2019 |
| CN | 110480639 A | 11/2019 |

(Continued)

OTHER PUBLICATIONS

Bostelman Towards Improved Forklift Safety. Proceedings of the 9th Workshop on Performance Metrics for Intelligent Systems, PERMIS I 09, ACM Press, New York, New York, USA, Sep. 21, 2009 (Sep. 21, 2009), pp. 297-302.

(Continued)

*Primary Examiner* — Muhammad S Islam
(74) *Attorney, Agent, or Firm* — Lerner David LLP

(57) ABSTRACT

A system for automated guided vehicle safety may include an automated guided vehicle (AGV) having a propulsion system configured to move the AGV, and a processor configured to control the propulsion system, and a laser imaging system configured to deploy a virtual safety fence at least partially surrounding the AGV. The laser imaging system may include a plurality of laser imaging sensors including a front sensor and a rear sensor, and a movable boom, the front sensor being mounted to the movable boom and configured to extend in front of the housing of the AGV.

21 Claims, 7 Drawing Sheets

(56) References Cited

FOREIGN PATENT DOCUMENTS

| | | |
|---|---|---|
| CN | 110494900 A | 11/2019 |
| CN | 106808496 B | 6/2020 |
| CN | 110696000 B | 12/2020 |
| DE | 102004019888 A1 | 11/2004 |
| DE | 102018203552 A1 | 9/2018 |
| EP | 1901151 B1 | 2/2010 |
| EP | 2366504 A2 | 9/2011 |
| EP | 2695027 B1 | 8/2015 |
| EP | 2829939 B1 | 11/2019 |
| JP | 2004322244 A | 11/2004 |

OTHER PUBLICATIONS

International Search Report and Written Opinion for International Application No. PCT/US2022/046283 dated Jan. 30, 2023. 18 pages.

* cited by examiner

DEPLOYABLE SAFETY FENCE FOR MOBILE ROBOTS

BACKGROUND

The field of industrial mobile robotics is growing quickly with a wide array of AGVs (automatically guided vehicles) and AMRs (Autonomous Mobile Robots) readily available from many different manufacturers. However, one type of such systems that is still in its infancy is that of an AGV or AMR with an industrial robotic manipulator integrated into/onto it. While there are many factors that make such a system challenging to deploy, one of the major reasons is safety. Large industrial mobile robotic systems capable of handling heavy payloads are necessarily powerful and thus pose a safety risk to personnel working near them. Industry accepted safety standards are in place to guide engineers in their application of safety equipment and programming. However, these standards do not take into account the combined system of an industrial AGV and an industrial robotic arm. There are organizations that are currently working on harmonized standards that apply to such a system, but these standards are still in their infancy.

Data centers have a need for a system to robotically manipulate server trays and batteries therein. Traditionally, these types of systems rely on horizontally mounted safety lidar scanners to detect the presence of something (or someone) entering a protected zone around the robot. This solution is effective in an open area where the robot has unobstructed 'visibility' or in areas with well-defined geometry, so that the safety sensors can detect and modify their protective fields accordingly. Unfortunately, in some data centers, the aisles in which the system is intended to operate are neither wide open, nor do they have well-defined or consistent geometry that the safety system can utilize.

The safety standards applied to the AGV portion of the system take these types of operating environments into account, but for the industrial robot mounted on top of the AGV, the confined space and variability of rack positions within the aisles pose serious challenges. Server racks installed in the aisles provide areas in which personnel could conceal themselves from the robots' safety lidar, thereby blocking them from view and allowing them to be too close to processes that pose safety risks.

BRIEF SUMMARY

The present disclosure provides for a system for automated guided vehicle safety and method for deploying a virtual safety fence for an automated guided vehicle (AGV).

One aspect of the disclosure provides a system for automated guided vehicle safety. The system may include an AGV having a propulsion system configured to move the AGV, and a processor configured to control the propulsion system, and a laser imaging system configured to deploy a virtual safety fence at least partially surrounding the AGV. The laser imaging system may include a plurality of laser imaging sensors including a front sensor and a rear sensor, and a movable boom, the front sensor being mounted to the movable boom and configured to extend in front of the housing of the AGV.

The system may also include a robotic manipulator mounted to the AGV and having an end effector, the end effector configured to extend a first maximum distance in front of a housing of the AGV. The virtual safety fence may at least partially surround a work area of the robotic manipulator, and the front sensor may be configured to extend to a second distance in front of the housing of the AGV, the second distance being greater than the first maximum distance.

The front sensor may be a first front sensor. The plurality of laser imaging sensors may also include a second front sensor mounted to the movable boom and configured to extend to the second distance in front of the housing of the AGV. The first and second front sensors may together be configured to deploy a planar front boundary of the work area of the robotic manipulator. The rear sensor may be a first rear sensor that is mounted to the housing of the AGV. The plurality of laser imaging sensors may also include a second rear sensor mounted to the housing of the AGV. The first and second rear sensors may together be configured to deploy a planar rear boundary of the work area of the robotic manipulator.

The plurality of laser imaging sensors may also include a left sensor and a right sensor each mounted to the housing of the AGV. The left sensor may be configured to deploy a planar left boundary of the work area of the robotic manipulator. The right sensor may be configured to deploy a planar right boundary of the work area of the robotic manipulator. The laser imaging system may be configured to mute one or more of the left sensor and the right sensor if a storage rack is sensed on the respective left or right side of the work area of the robotic manipulator, so that the work area of the robotic manipulator is bounded by the storage rack instead of the respective planar left boundary or the planar right boundary.

The planar front boundary, the planar rear boundary, the planar left boundary, and the planar right boundary may together form a complete perimeter of the work area of the robotic manipulator. The plurality of laser imaging sensors may also include a bottom sensor mounted to a front of the housing of the AGV, the bottom sensor configured to detect whether a person is disposed on a floor of the work area of the robotic manipulator. The AGV may be configured to store a plurality of payloads, and the robotic manipulator may be configured to place one or more of the plurality of payloads into empty positions within a storage rack disposed adjacent to the work area of the robotic manipulator.

The end effector may be configured to extend a third maximum distance above the housing of the AGV, and the front sensor and the rear sensor may each be disposed at a fourth distance above the housing of the AGV, the fourth distance being greater than the third maximum distance. The propulsion system may include a plurality of wheels rotatably mounted to the housing, a driving element configured to rotate the wheels, a steering system configured to navigate the housing along predetermined paths, and a processor configured to control the driving element and the steering system.

Another aspect of the disclosure provides a method for deploying a virtual safety fence for an automated guided vehicle. The method may include moving the AGV to a work area by a propulsion system that navigates the AGV, the AGV having a plurality of laser imaging sensors including a front sensor and a rear sensor. The method may include deploying the virtual safety fence at least partially surrounding the AGV. The deploying of the virtual safety fence may include moving the front sensor in front of the housing of the AGV, the moving including translating a movable boom to which the front sensor is mounted. The deploying of the virtual safety fence may include scanning planar boundaries of the work area with the front sensor and the rear sensor to determine if a moving object enters the work area.

The work area may be a work area of a robotic manipulator mounted to the AGV, the robotic manipulator having an end effector configured to extend to a first maximum distance in front of a housing of the AGV, and the virtual safety fence may at least partially surround the work area of the robotic manipulator. The method may also include moving the front sensor to a second distance in front of the housing of the AGV, the second distance being greater than the first maximum distance.

The front sensor may be a first front sensor, the plurality of laser imaging sensors may also include a second front sensor mounted to the movable boom, the deploying of the virtual safety fence may also include extending the second front sensor to the second distance in front of the housing of the AGV, and the first and second front sensors may together deploy a planar front boundary of the work area of the robotic manipulator. The rear sensor may be a first rear sensor that is mounted to the housing of the AGV, the plurality of laser imaging sensors may also include a second rear sensor mounted to the housing of the AGV, the deploying of the virtual safety fence may also include the first and second rear sensors together deploying a planar rear boundary of the work area of the robotic manipulator.

The plurality of laser imaging sensors may also include a left sensor and a right sensor each mounted to the housing of the AGV. The deploying of the virtual safety fence may also include the left sensor deploying a planar left boundary of the work area of the robotic manipulator, and the right sensor deploying a planar right boundary of the work area of the robotic manipulator. The method may also include one of the front sensors or one of the rear sensors sensing that a storage rack is disposed on the left or right side of the work area of the robotic manipulator. The method may also include muting one or more of the respective left sensor and the right sensor, so that the work area of the robotic manipulator is bounded by the storage rack instead of the respective planar left boundary or the planar right boundary.

The planar front boundary, the planar rear boundary, the planar left boundary, and the planar right boundary may together form a complete perimeter of the work area of the robotic manipulator. The plurality of laser imaging sensors may also include a bottom sensor mounted to a front of the housing of the AGV, the deploying of the virtual safety fence further including the bottom sensor detecting whether a person is disposed on a floor of the work area of the robotic manipulator. The AGV may be configured to store a plurality of payloads, the method further including the robotic manipulator placing one or more of the plurality of payloads into empty positions within a storage rack disposed adjacent to the work area of the robotic manipulator.

The end effector may be configured to extend a third maximum distance above the housing of the AGV, and the front sensor and the rear sensor may each be disposed at a fourth distance above the housing of the AGV, the fourth distance being greater than the third maximum distance. The propulsion system may include a plurality of wheels rotatably mounted to the housing, a driving element configured to rotate the wheels, a steering system configured to navigate the housing along predetermined paths, and a processor configured to control the driving element and the steering system.

DETAILED DESCRIPTION

Figure 1:
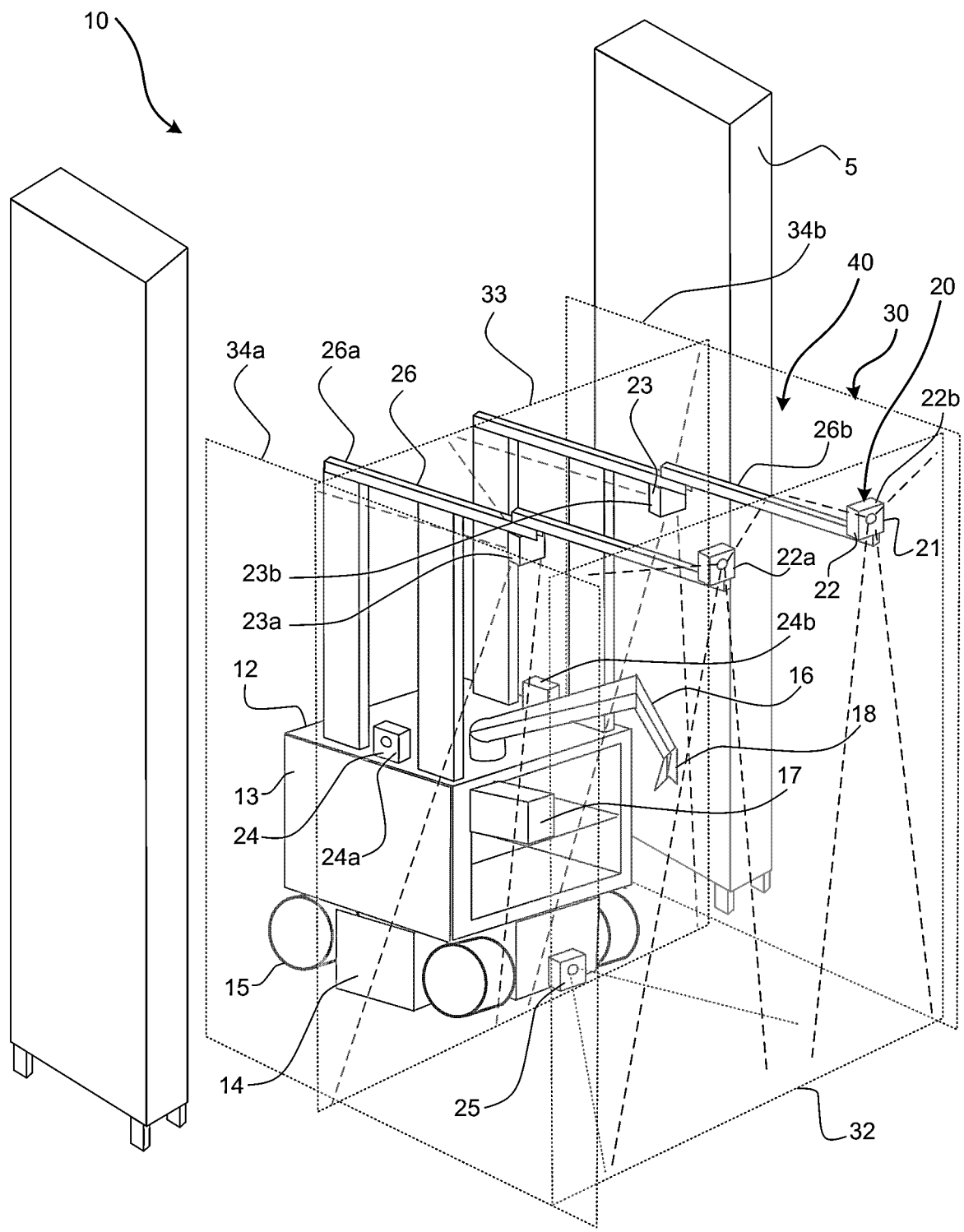
FIG. 1 shows a side perspective view of a system, in accordance with aspects of the disclosure.
Figure 2:
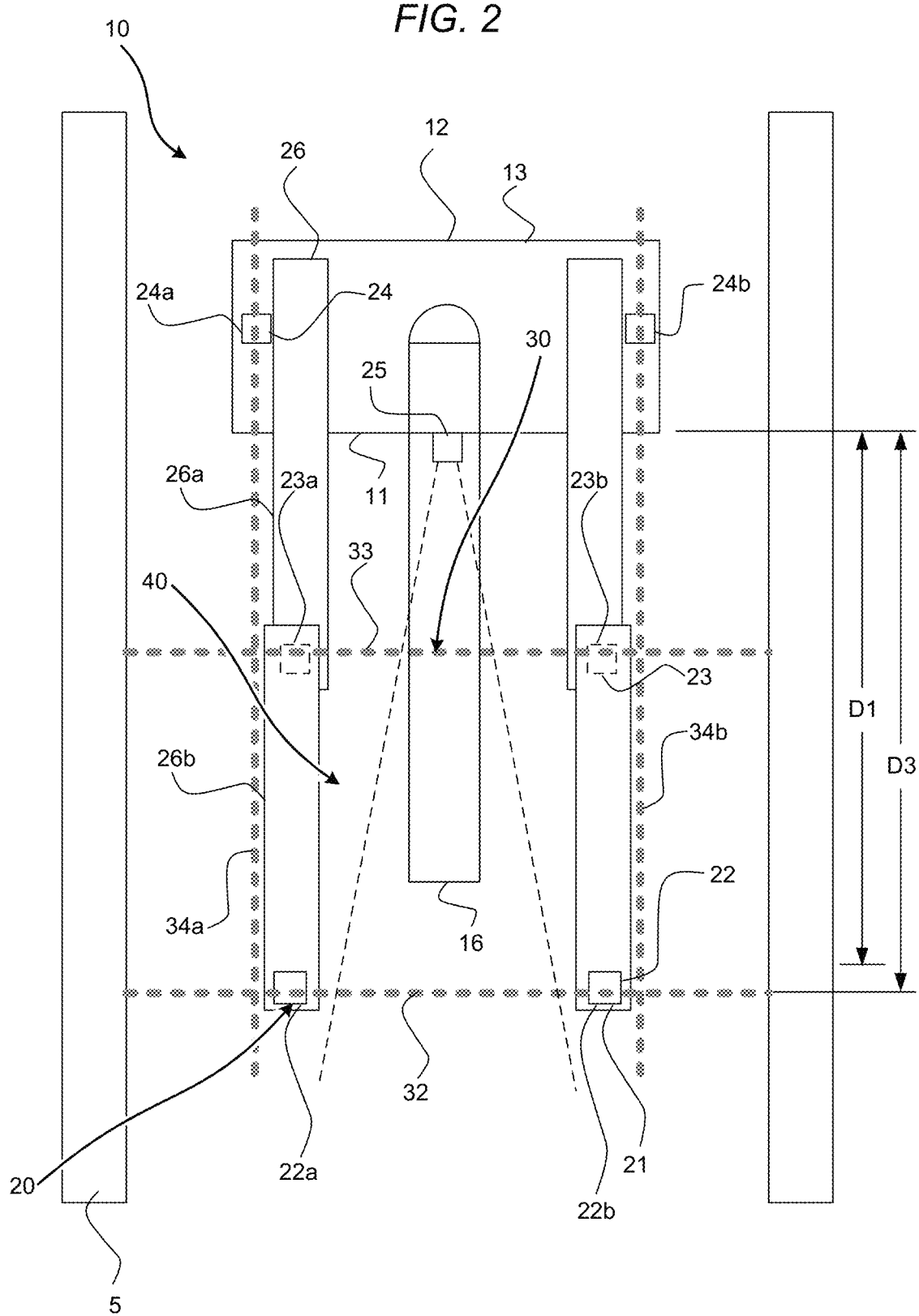
FIG. 2 shows a top plan view of the system of FIG. 1 in accordance with aspects of the disclosure.

The present disclosure provides for a deployable safety fence for an AGV having an integrated industrial robotic manipulator. As a deployable safety fence, the system is initially started in a retracted state, in which the AGV is free to move, but the robotic manipulator is restricted to a position it can maintain. After the AGV arrives at a target work area, one or more movable booms extend forward and lock into a deployable position that is monitored by rated safety proximity sensors (e.g., RFID and/or LIDAR sensors). The LIDAR sensors then search for walls and/or storage racks to the left and right of the AGV.

The searching mechanism is done on each scanner by progressively checking nearby zones for obstructions then expanding until a layer of zones are scanned. The scanning area expands based on the distance away from the AGV, getting progressively larger the further a zone is away from the robot workspace. This generates a fully enclosed virtual safety fence around the robotic manipulator that is protected in the case of a person trying to enter into the robot restricted space. Once the sensors detect a solid object on one or both sides of the AGV, then the vertical sides of the virtual safety fence can be muted to allow the robotic manipulator to work on an object on that side. If one of the area scanners cannot find a solid obstruction, then that side cannot be muted and must remain active. This example would be in the case of operating in a wide area on the left, while work needed to be done on the right, or vice versa. The area scanners that did not detect a wall or obstruction remain active, as a human could appear on that side.

By extending out the sensors and muting based on expandable virtual walls, the robotic manipulator can work in a data center aisle in which there is variability in the spacing between racks and staggering of racks that would otherwise cause gaps in the safety fence, which could lead to a safety hazard for data center employees.

As illustrated in FIGS. 1-5, a system 10 for automated guided vehicle safety may include an automated guided vehicle 12 (AGV) having a housing 13 and a propulsion system 14 configured to move the AGV. The housing 13 is generally in the shape of a rectangular prism, but in other examples, the housing may have any other shape, such as a square prism, a cylinder, or the like. In other examples, the housing 13 may be omitted, such that mechanical and/or electrical components of the AGV 12 are exposed.

The propulsion system 14 may include a motor or another driving element (not shown) that is configured to rotate a plurality of wheels 15 that are rotatably mounted to the housing 13, a steering system (not shown) that is configured to navigate the AGV 12 along predetermined paths, and a processor or control system 100 (to be described below in FIG. 6) that is configured to control the propulsion system (including the driving element and the steering system). The propulsion system 14 may include many types of AGV drive system and/or wheel 15 combinations that allow the vehicle to move, such as Mecanum wheels, omnidirectional wheels, or a differential drive system, among others. The AGV 12 may also include sensors (not shown) for detecting where the AGV should be navigated. The example configuration of the AGV 12 that is shown in FIGS. 1-5 is merely one possible example of a flexible mobile robotics platform. In other examples, there may be many other configurations of components for moving the AGV 12 from one location to another.

The system 10 may include a robotic manipulator 16 mounted to the AGV 12 and having an end effector 18 that may be configured to extend a first maximum distance D1 (FIG. 2) in front of the housing 13 of the AGV and may be configured to extend a second maximum distance D2 (FIG. 4) above the housing of the AGV. The AGV 12 may be configured to store a plurality of payloads 17 therein, and the robotic manipulator 16 may be configured to place one or more of the plurality of payloads into empty positions within a storage rack 5 disposed adjacent to the work area of the robotic manipulator. Delivering payloads is merely one example of a task that the system 10 is designed to accomplish. Other examples may include performing assembly operations or performing automated imaging and diagnostics, among others.

The system 10 may include a laser imaging system 20 configured to deploy a virtual safety fence 30 at least partially surrounding a work area 40 of the robotic manipulator 16. The laser imaging system 20 may include a plurality of laser imaging sensors 21 including one or more front sensors 22 and one or more rear sensors 23. The laser imaging system 20 may also include a movable boom 26, having a fixed portion 26a affixed to the housing 13 of the AGV 12 and a slidable portion 26b that is translatable relative to the fixed portion.

The front sensors 22 may be mounted to the slidable portion 26b of the movable boom 26 and may be configured to extend to a third distance D3 (FIG. 2) in front of the housing 13 of the AGV 12, the third distance D3 being greater than the first maximum distance D1. The front sensors 22 are mounted to the slidable portion 26b at a height that is a fourth distance D4 (FIG. 4) above the housing 13 of the AGV 12, the fourth distance D4 being greater than the second maximum distance. In other words, the front sensors 22 are configured to extend to distances D3, D4 that are higher and farther in front of the AGV 12 than the maximum height and reach D1, D2 of the end effector 18 of the robotic manipulator 16. In some examples, the end effector 18 may reach a greater height than the fourth distance D4 at which the front sensors 22 are mounted, as long as the virtual safety fence 30 extends high enough that nearby personnel could not reach over the virtual safety fence and endanger themselves. Likewise, in some examples, the end effector 18 may be physically capable of reaching farther in front of the AGV 12 than the third distance D3, but the system 10 would stop moving the end effector if it broke the protective field defined by the virtual safety fence 30. The system 10 may have safe position monitoring, such that the end effector 18 may be physically capable of moving beyond the distances D3, D4, but the end effector is blocked from doing so in the software of the system.

While the AGV 12 is moving, the slidable portion 26b of the movable boom 26 may be in a retracted position (FIG. 5) mostly overlying the fixed portion 26a, such that the front sensors 22 are close to the front 11 of the housing 13 of the AGV 12, and the end effector 18 of the robotic manipulator 16 may also be in a retracted position close to the front of the housing. Once the AGV 12 arrives at a work area 40, the slidable portion 26b of the movable boom 26 may extend forward and into a deployed position (FIG. 4), with the front sensors 22 positioned at the third distance D3 in front of the housing 13 of the AGV.

The rear sensors 23 may be mounted to the fixed portion 26a of the movable boom 26, such that locations of the rear sensors relative to the housing 13 is fixed. The rear sensors 23 are mounted to the fixed portion 26a at a height that is at a fifth distance D5 (FIG. 4) above the housing 13 of the AGV 12. The fifth distance D5 may be generally about the same as the fourth distance D4 (greater, equal, or smaller depending on the specific design chosen), but the fifth distance D5 may be greater than the second maximum distance D2 that is the maximum height that the end effector 18 can reach. Similar to the relationship between the reach of the end effector 18 and the position of the front sensors 22, the end effector may reach a greater height than the fifth distance D5 at which the rear sensors 23 are mounted, as long as the virtual safety fence 30 extends high enough that nearby personnel could not reach over the virtual safety fence and endanger themselves. The rear sensors 23 may be mounted at a location that approximately overlies the front 11 of the housing 13 of the AGV 12, so that once the robotic manipulator 16 withdraws a payload 17 out of the AGV, the payload will be in front of the rear sensors.

The plurality of laser imaging sensors 21 may each be a LIDAR scanner. Each of the laser imaging sensors 21 may scan a two-dimensional portion of space around the AGV 12, such that together, the laser imaging sensors may deploy planar boundaries of the work area 40 of the robotic manipulator 16. The planar boundaries may together form a virtual safety fence 30 that is configured to halt movement of the robotic manipulator 16 if something (e.g., a person or a part of a person) traverses any portion of the virtual safety fence.

The front sensors 22 may include a first front sensor 22a on the left side of the AGV 12 with respect to FIG. 1, and a second front sensor 22b on the right side of the AGV. The first and second front sensors 22a, 22b may together be configured to deploy a planar front boundary 32 of the work area 40 of the robotic manipulator 16. The rear sensors 23 may include a first rear sensor 23a on the left side of the AGV 12, and a second rear sensor 23b on the right side of the AGV. The first and second rear sensors 23a, 23b may together be configured to deploy a planar rear boundary 33 of the work area 40 of the robotic manipulator 16.

The plurality of laser imaging sensors 21 may include side sensors 24 that are a left sensor 24a and a right sensor 24b each mounted to the housing 13. The left sensor 24a may be configured to deploy a planar left boundary 34a of the work area 40 of the robotic manipulator 16, and the right sensor 24b may be configured to deploy a planar right boundary 34a of the work area of the robotic manipulator. The virtual safety fence 30 may include the planar front boundary 32, the planar rear boundary 33, the planar left boundary 34a, and the planar right boundary 34b, which may together form a complete perimeter of the work area 40 of the robotic manipulator 16. In the can be seen in FIG. 2 that the boundaries 32, 33, 34a, and 34b may together form a hash symbol or pound sign shape.

The laser imaging system 20 may be configured to mute one or more of the left sensor 24a and the right sensor 24b if a storage rack 5 is sensed on the respective left or right side of the work area 40 of the robotic manipulator 16, so that the work area of the robotic manipulator is bounded by the storage rack instead of the respective planar left boundary 34a or the planar right boundary 34b. In other words, when the left sensor 24a and/or the right sensor 24b is muted, the corresponding virtual boundary 34a and/or 34b is not deployed, so that a portion 6 of the storage rack 5 bounds the work area 40 in place of the virtual boundary.

To sense if a storage rack 5 or a wall is present adjacent to the work area 40, the laser imaging sensors 21 may scan areas of the Data Center around the housing 13 of the AGV 12. The scanning mechanism may be done by each of the laser imaging sensors 21 by progressively checking areas around the housing 13 for blockages (walls or storage racks 5) then expanding the search areas until data is received regarding which zones are blocked. The search areas may be expanded based on the distance of the blockage away from the AGV 12, getting progressively larger the further the blocked zone is away from the work area 40.

Figure 3:
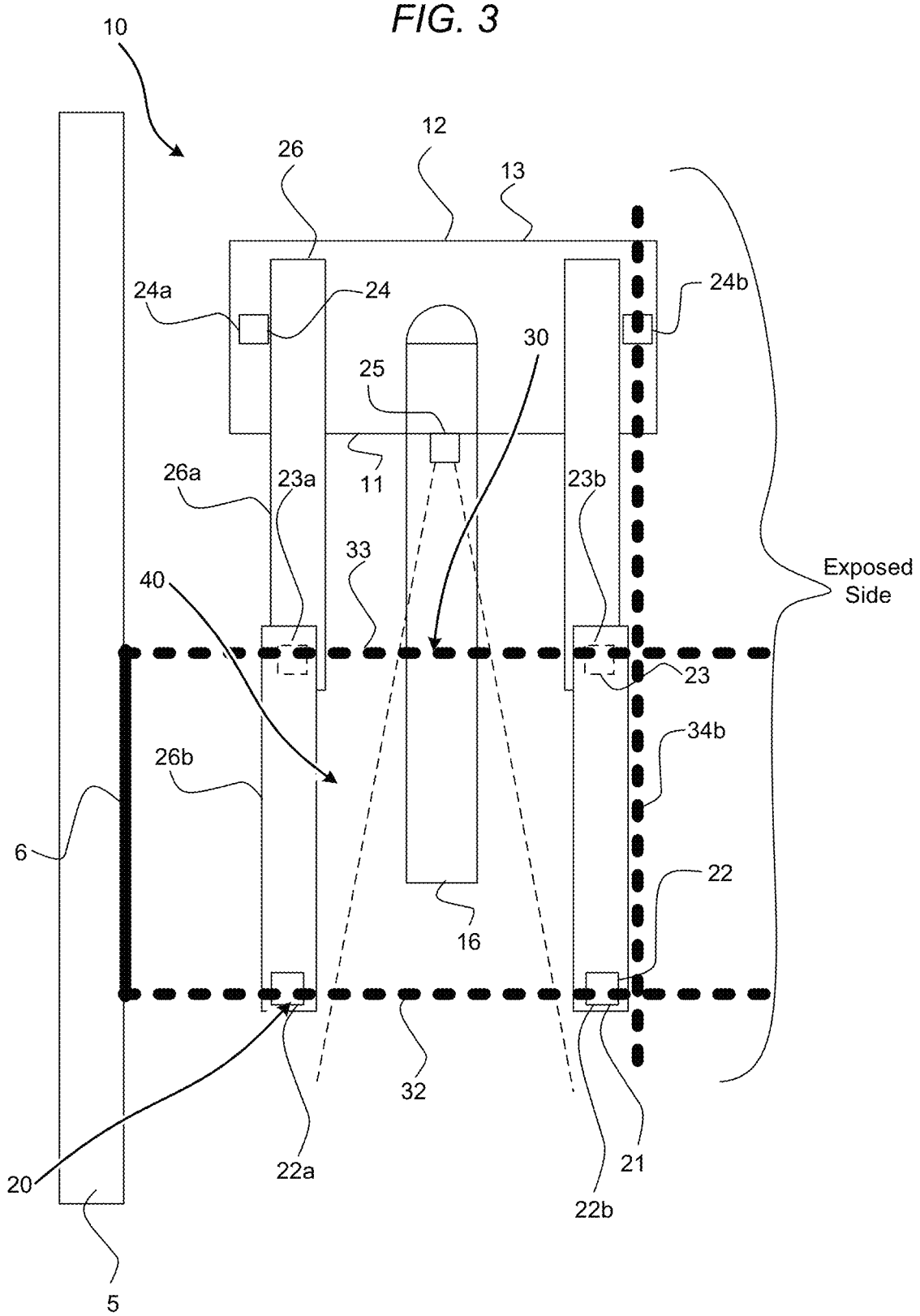
FIG. 3 shows a top plan view of the system of FIG. 1 in accordance with aspects of the disclosure, in a configuration in which a side sensor is muted.

As illustrated in FIG. 3, the muting of one or both of the side sensors 24 may be used when the robotic manipulator 16 will be traversing the location that would be occupied by the planar left boundary 34a and/or the planar right boundary 34b, to place a payload 17 into an empty position within the storage rack 5. In use, only one of the left side or right side of the AGV 12 may be adjacent to a storage rack 5, while the other side may be exposed to potential intrusion by people working in the Data Center. In such a situation, the planar boundary that is adjacent to the storage rack 5 (e.g., the left boundary 34a) may be muted, while the exposed planar boundary (e.g., the right boundary 34b) will be deployed. A portion 6 of the storage rack 5 may bound the work area 40 in place of the virtual boundary 34a that is muted.

The plurality of laser imaging sensors 21 may include a bottom sensor 25 mounted to the front 11 of the housing 13 of the AGV 12, the bottom sensor configured to detect whether a person is disposed on a floor of the work area 40 of the robotic manipulator 16. In this way, the presence of a person within the work area 40 can be detected even if the person is already in the work area before the virtual safety fence 30 is deployed.

The design of the system 10 for automated guided vehicle safety shown in FIGS. 1-5 is just one example of the safety system. Many other configurations of the safety system 10 are contemplated, including laser imaging systems 20 having different numbers of laser imaging sensors 21, movable booms 26 with different widths, heights, and/or arrangements, and AGVs 12 of various designs. In some configurations, the laser imaging system 20 may have more or less than 7 laser imaging sensors 21, such as 4, 5, 6, 8, or 10, among others.

The system 10 for automated guided vehicle safety may also be used in environments other than data centers. For example, the system 10 may be used for manufacturing or retail payloads. For example, the system 10 may place products on a storage rack 5 in a warehouse or any environment in which payloads need to be placed in an automated manner.

Figure 6:
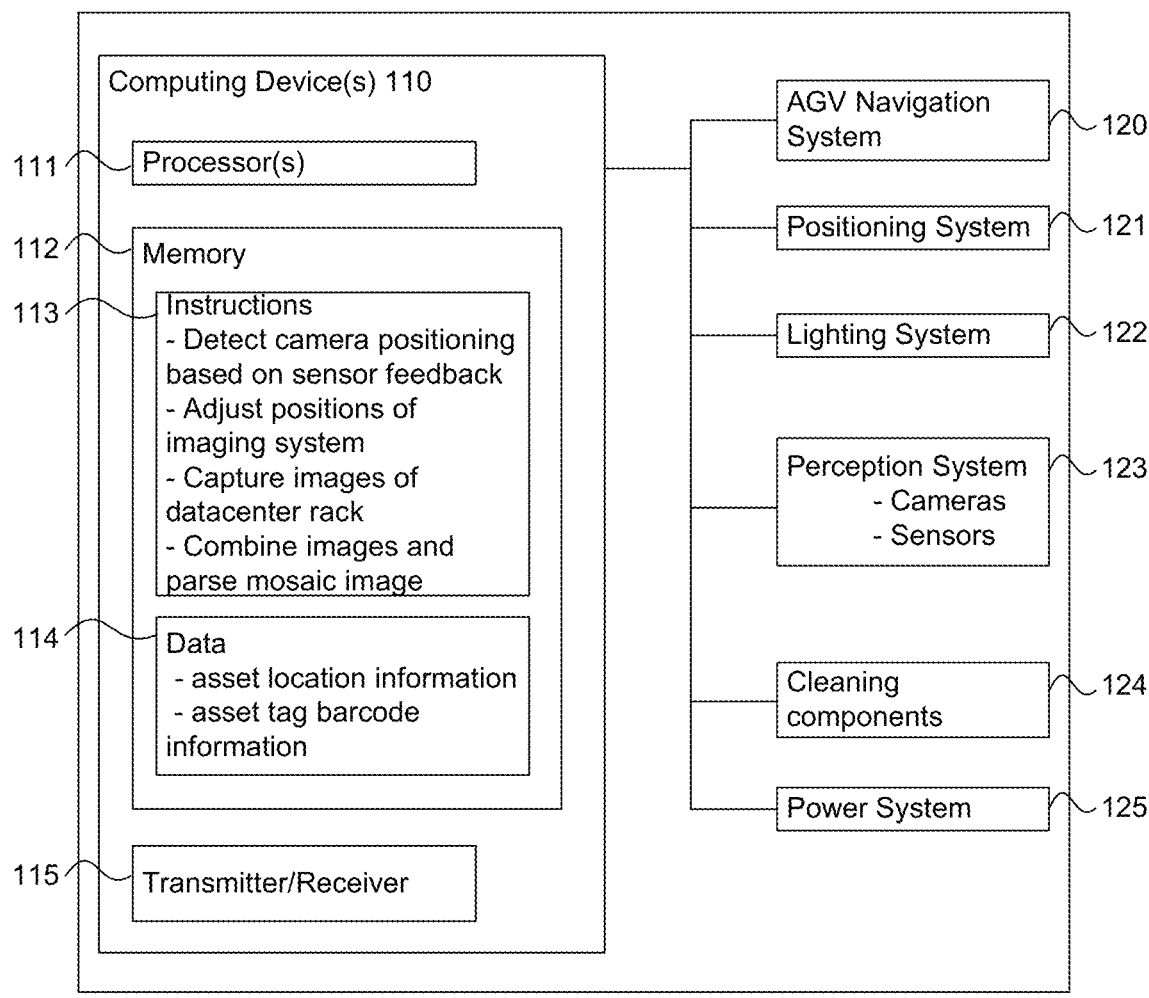
FIG. 6 shows a block diagram of a controller in accordance with aspects of the disclosure.

Referring to FIG. 6, an example control system 100 is illustrated. As shown, the control system 100 includes one or more computing devices 110 coupled to various components 120-125, such as AGV navigation system 120, positioning system 121, lighting 122, perception system 123, cleaning components 124, and power system 125. The computing device 110 further includes one or more processors 111, memory 112, and other components typically present in microprocessors, general purpose computers, or the like.

The one or more processors 111 may be any conventional processors, such as commercially available microprocessors. Alternatively, the one or more processors may be a dedicated device such as an application specific integrated circuit (ASIC) or other hardware-based processor. In some examples, the one or more processors may include a graphics processing unit (GPU) and/or a tensor processing unit (TPU), for example, for machine-learning based perception. Although FIG. 6 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of computing device 110. Accordingly, references to a processor or computing device will be understood to include references to a collection of processors or computing devices or memories that may or may not operate in parallel.

Memory 112 may store information that is accessible by the processors 111, including instructions 113 that may be executed by the processors, and data 114 such as asset location information and/or asset tag barcode information. Such instructions 113 may include detecting end effector positioning based on sensor feedback, adjusting positions of the slidable portion 26b of the movable boom 26, and determining locations of the storage racks 5. The memory 112 may be of a type of memory operative to store information accessible by the processors 111, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 113 and data 114 are stored on different types of media.

Data 114 may be retrieved, stored or modified by processors 111 in accordance with the instructions 113. For instance, although the present disclosure is not limited by a particular data structure, the data 114 may be stored in computer registers, in a relational database as a table having a plurality of different fields and records, XML documents, or flat files. The data 114 may also be formatted in a computer-readable format such as, but not limited to, binary values, ASCII or Unicode. By further way of example only, the data 114 may be stored as bitmaps comprised of pixels that are stored in compressed or uncompressed, or various image formats (e.g., JPEG), vector-based formats (e.g., SVG) or computer instructions for drawing graphics. Moreover, the data 114 may comprise information sufficient to identify the relevant information, such as numbers, descriptive text, proprietary codes, pointers, references to data stored in other memories (including other network locations) or information that is used by a function to calculate the relevant data.

In one example, computing device 110 may be an AGV computing system incorporated into control system 100, such as an AGV 12 having a laser imaging system 20. The computing device may be capable of communicating with various components of the system autonomously, or without continuous input from a human operator. For example, computing device 110 may be in communication with various components 120-125 of the control system 100, which operate in accordance with the instructions 113 of memory 112 in an autonomous mode which does not require or need continuous or periodic input from an operator. Although these systems are shown as external to computing device 110, in other examples these systems may also be incorporated into the computing device.

The instructions 113 may be executed to perform various operations using one or more of the components 120-125 or other components not shown. For example, the AGV navigation system 120 may include a GPS or other system which directs the AGV to a target storage rack 5 for delivery of a payload 17. The positioning system 121 may be instructed to respond to feedback provided by the perception system 123, which may include one or more cameras, sensors, etc. For example, the positioning system 121 may include one or more motors or other devices used to control positioning of the AGV 12 and/or the front sensors 22. As the perception system 123 provides data regarding proximity of the target location within the Data Center, the positioning system 121 may adjust a position of one or more of the AGV 12 or the slidable portion 26b of the movable boom 26 so as to maintain a position where the virtual safety fence 30 can deploy around the target work area 40.

Lighting system 122 may include one or more LEDs or other illuminating devices. The lighting system 122 may be instructed to illuminate a target location of the Data Center any time the AGV 12 is within a predetermined distance from the target work area 40, when environmental conditions are such that natural light is insufficient, or under any other circumstances. In this regard, the lighting system 122 may also be responsive to input from the perception system 123, such as feedback from light or proximity sensors. Similarly, cleaning components 124 may also respond to feedback from the perception system 123. For example, the one or more processors 111 may determine, based on images captured by the perception system 123, that the target work area 40 is dirty. As such dirt may be obstructing information, such as an asset tag barcode that needs to be read to determine which component is in a particular storage rack 5, the cleaning components 124 may be instructed to spray air or perform some other operation to clear the debris. The power system 125 may include, for example, a battery for powering the control system 100.

While the components 110-115 and 120-125 are described above in reference to an example of deploying a virtual safety fence 30 in a Data Center, it should be understood that the components may also operate in response to operator input or other instructions. For example, the computing device 110 may provide information to a remote computing device, such as an operator control unit, through transmitter/receiver 115. Likewise, the computing device 110 may receive instructions from the remote operator control unit. In other examples, the control system 100 may operate in an autonomous mode, but still provide feedback to a remote computing device using the transmitter/receiver 115.

Figure 7:
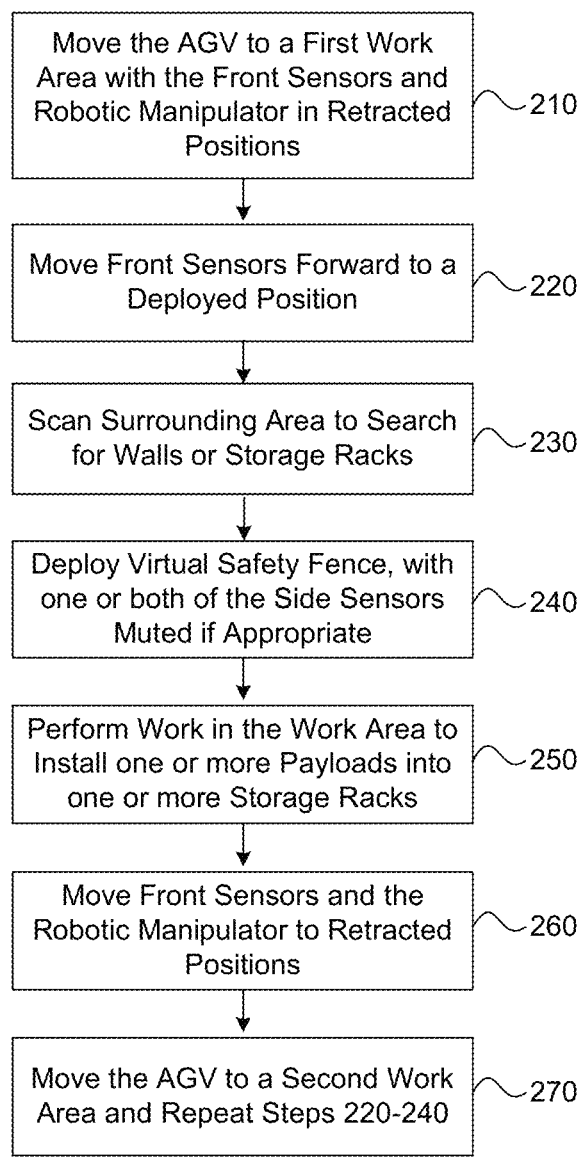
FIG. 7 is a flow chart illustrating an example method in accordance with one aspect of the disclosure.

Referring to FIG. 7, in addition to the operations described above and illustrated in the figures, various operations will now be described. The following operations do not have to be performed in the precise order described below. Rather, various operations can be handled in a different order or simultaneously, and operations may also be added or omitted. FIG. 7 illustrates a flow chart 200 showing an example deployment of the virtual safety fence 30.

Figure 4:
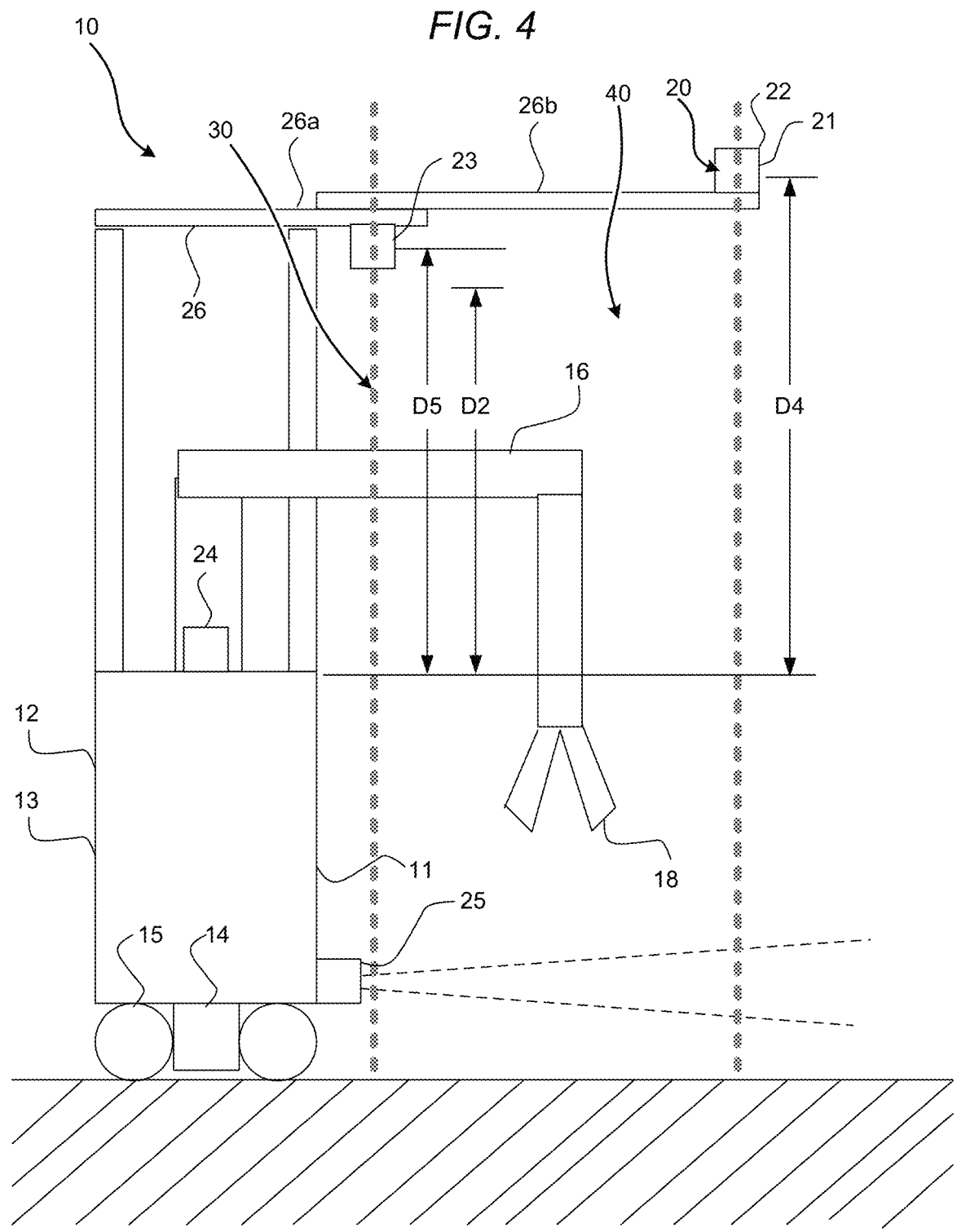
FIG. 4 shows a side view of the system of FIG. 1 in accordance with aspects of the disclosure.
Figure 5:
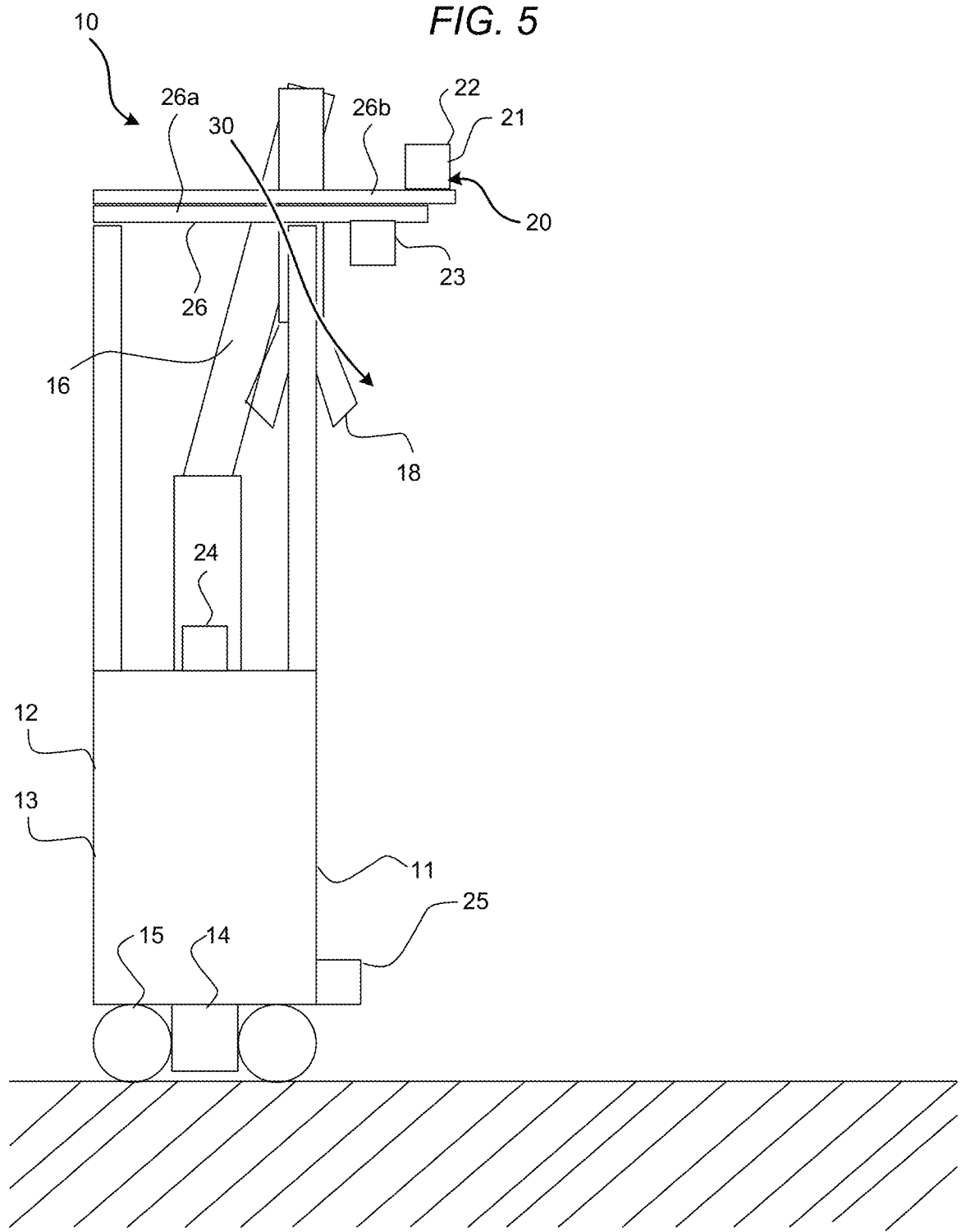
FIG. 5 shows a top plan view of the system of FIG. 1 in accordance with aspects of the disclosure, in a retracted position.

In block 210, the AGV 12 may move to a first work area 40 aligned with a first storage rack 5 within a data center. This may be performed by the AGV navigation system 120 controlling the propulsion system 16. The AGV navigation system 120 may be controlled by the computing device 110 and/or a human operator that is remote from the AGV 12. While the AGV 12 is moving, the slidable portion 26b of the movable boom 26 is in a retracted position (FIG. 5) mostly overlying the fixed portion 26a, such that the front sensors 22 are close to the front 11 of the housing 13 of the AGV 12, and the end effector 18 of the robotic manipulator 16 is also in a retracted position close to the front of the housing. In block 220, after the AGV 12 arrives at the work area 40, the slidable portion 26b of the movable boom 26 extends forward and locks into a deployed position (FIG. 4).

In block 230, the laser imaging sensors 21 search for walls or storage racks 5 in areas of the data center around the housing 13 of the AGV 12. The searching mechanism is done by each of the laser imaging sensors 21 by progressively checking areas around the housing 13 for blockages (walls or storage racks 5) then expanding the search areas until data is received regarding which zones are blocked. The search areas are expanded based on the distance of the blockage away from the AGV 12, getting progressively larger the further the blocked zone is away from the work area 40. This procedure generates a fully enclosed virtual safety fence 30 around the AGV 12 that is protected in the case of a person trying to enter the work area 40.

In block 240, once the laser imaging sensors 21 detect a solid object on the left and/or right side of the housing 13 of the AGV 12, then the corresponding planar left boundary 34a and/or planar right boundary 34b may be muted (not monitored) to allow the robotic manipulator 16 to install a payload 17 into a storage rack 5 on that side. If one of the laser imaging sensors 21 cannot find a solid wall or a storage rack 5 on a particular side of the housing 13, then the side sensor 24 on that side will not be muted and will deploy and monitor the corresponding planar boundary 34a or 34b. This example would be in the case of operating the robotic manipulator 16 in a work area 40 that is widely open on the left, while work needed to be done at a storage rack 5 on the right, or vice versa. In that case, the left sensor 24a would remain active and would deploy the left planar boundary 34a of the work area 40, while a portion 6 of the storage rack 5 on the right side of the housing 13 would serve as a boundary of the work area.

By extending out the front sensors 23 and muting one or both of the side sensors 24 based on expandable virtual planar boundaries 32, 33, 34a, and 34b, the robotic manipulator 16 can work in a Data Center aisle in which there is variability in the spacing between storage racks 5 and staggering of storage racks that would otherwise cause gaps in the virtual safety fence 30, which could lead to a safety hazard for data center employees.

In block 250, the robotic manipulator 16 can perform work in the work area 40, to install one or more payloads 17 into one or more storage racks 5 adjacent to the work area. In block 260, once the work in the first work area 40 is completed, the robotic manipulator 16 can be returned to the retracted position, and the slidable portion 26b of the movable boom 26 can extend rearward and lock into the retracted position.

In block 270, the AGV 12 may move to a second work area 40 aligned with a second storage rack 5 within the Data Center, The AGV 12 may be travel along a predetermined path in an aisle between adjacent storage racks 5. This may be performed by the AGV navigation system 120 controlling the propulsion system 16. The AGV navigation system 120 may be controlled by the computing device 110 and/or a human operator that is remote from the AGV 12. Once the AGV 12 arrives at the second work area 40, blocks 220-240 may be repeated to safely install additional payloads 17.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for automated guided vehicle safety, the system comprising:
   an automated guided vehicle (AGV) having a propulsion system configured to move the AGV, and a processor configured to control the propulsion system; and
   a laser imaging system configured to deploy a virtual safety fence at least partially surrounding the AGV, the laser imaging system including:
   a plurality of laser imaging sensors including a front sensor and a rear sensor; and
   a movable boom, the front sensor being mounted to the movable boom and configured to extend in front of the housing of the AGV; and
   a robotic manipulator mounted to the AGV and having an end effector, the end effector configured to extend a first maximum distance in front of a housing of the AGV,
   wherein the virtual safety fence at least partially surrounds a work area of the robotic manipulator, and the front sensor is configured to extend to a second distance in front of the housing of the AGV, the second distance being greater than the first maximum distance.

2. The system of claim 1, wherein the front sensor is a first front sensor, the plurality of laser imaging sensors further includes a second front sensor mounted to the movable boom and configured to extend to the second distance in front of the housing of the AGV, and the first and second front sensors are together configured to deploy a planar front boundary of the work area of the robotic manipulator.

3. The system of claim 1, wherein the propulsion system includes a plurality of wheels rotatably mounted to the housing, a driving element configured to rotate the wheels, a steering system configured to navigate the housing along predetermined paths, and the processor configured to control the driving element and the steering system.

4. The system of claim 2, wherein the rear sensor is a first rear sensor that is mounted to the housing of the AGV, the plurality of laser imaging sensors further includes a second rear sensor mounted to the housing of the AGV, and the first and second rear sensors are together configured to deploy a planar rear boundary of the work area of the robotic manipulator.

5. The system of claim 4, wherein the plurality of laser imaging sensors further includes a left sensor and a right sensor each mounted to the housing of the AGV, the left sensor configured to deploy a planar left boundary of the work area of the robotic manipulator, and the right sensor configured to deploy a planar right boundary of the work area of the robotic manipulator.

6. The system of claim 5, wherein the laser imaging system is configured to mute one or more of the left sensor and the right sensor if a storage rack is sensed on the respective left or right side of the work area of the robotic manipulator, so that the work area of the robotic manipulator is bounded by the storage rack instead of the respective planar left boundary or the planar right boundary.

7. The system of claim 5, wherein the planar front boundary, the planar rear boundary, the planar left boundary, and the planar right boundary together form a complete perimeter of the work area of the robotic manipulator.

8. A system for automated guided vehicle safety, the system comprising:
   an automated guided vehicle (AGV) having a propulsion system configured to move the AGV, and a processor configured to control the propulsion system; and
   a laser imaging system configured to deploy a virtual safety fence at least partially surrounding the AGV, the laser imaging system including:
   a plurality of laser imaging sensors including a front sensor and a rear sensor; and
   a movable boom, the front sensor being mounted to the movable boom and configured to extend in front of the housing of the AGV,
   wherein the plurality of laser imaging sensors further includes a bottom sensor mounted to a front of the housing of the AGV, the bottom sensor configured to detect whether a person is disposed on a floor of the work area of the robotic manipulator.

9. A system for automated guided vehicle safety, the system comprising:
   an automated guided vehicle (AGV) having a propulsion system configured to move the AGV, and a processor configured to control the propulsion system; and
   a laser imaging system configured to deploy a virtual safety fence at least partially surrounding the AGV, the laser imaging system including:
   a plurality of laser imaging sensors including a front sensor and a rear sensor; and
   a movable boom, the front sensor being mounted to the movable boom and configured to extend in front of the housing of the AGV,
   wherein the AGV is configured to store a plurality of payloads, and the robotic manipulator is configured to place one or more of the plurality of payloads into empty positions within a storage rack disposed adjacent to the work area of the robotic manipulator.

10. A system for automated guided vehicle safety, the system comprising:
    an automated guided vehicle (AGV) having a propulsion system configured to move the AGV, and a processor configured to control the propulsion system; and
    a laser imaging system configured to deploy a virtual safety fence at least partially surrounding the AGV, the laser imaging system including:
    a plurality of laser imaging sensors including a front sensor and a rear sensor; and
    a movable boom, the front sensor being mounted to the movable boom and configured to extend in front of the housing of the AGV,
    wherein the end effector is configured to extend a third maximum distance above the housing of the AGV, and the front sensor and the rear sensor are each disposed at a fourth distance above the housing of the AGV, the fourth distance being greater than the third maximum distance.

11. A method for deploying a virtual safety fence for an automated guided vehicle (AGV), the method comprising:
moving the AGV to a work area by a propulsion system that navigates the AGV, the AGV having a plurality of laser imaging sensors including a front sensor and a rear sensor;
deploying the virtual safety fence at least partially surrounding the AGV, the deploying including:
moving the front sensor in front of the housing of the AGV, the moving including translating a movable boom to which the front sensor is mounted; and
scanning planar boundaries of the work area with the front sensor and the rear sensor to determine if a moving object enters the work area.

12. The method of claim 11, wherein the work area is a work area of a robotic manipulator mounted to the AGV, the robotic manipulator having an end effector configured to extend to a first maximum distance in front of a housing of the AGV, and the virtual safety fence at least partially surrounds the work area of the robotic manipulator,
the method further comprising moving the front sensor to a second distance in front of the housing of the AGV, the second distance being greater than the first maximum distance.

13. The method of claim 11, wherein the plurality of laser imaging sensors further includes a bottom sensor mounted to a front of the housing of the AGV, the deploying of the virtual safety fence further including the bottom sensor detecting whether a person is disposed on a floor of the work area of the robotic manipulator.

14. The method of claim 11, wherein the AGV is configured to store a plurality of payloads, the method further including the robotic manipulator placing one or more of the plurality of payloads into empty positions within a storage rack disposed adjacent to the work area of the robotic manipulator.

15. The system of claim 11, wherein the end effector is configured to extend a third maximum distance above the housing of the AGV, and the front sensor and the rear sensor are each disposed at a fourth distance above the housing of the AGV, the fourth distance being greater than the third maximum distance.

16. The method of claim 11, wherein the propulsion system includes a plurality of wheels rotatably mounted to the housing, a driving element configured to rotate the wheels, a steering system configured to navigate the housing along predetermined paths, and a processor configured to control the driving element and the steering system.

17. The method of claim 12, wherein the front sensor is a first front sensor, the plurality of laser imaging sensors further including a second front sensor mounted to the movable boom, the deploying of the virtual safety fence further including:
extending the second front sensor to the second distance in front of the housing of the AGV; and
the first and second front sensors together deploying a planar front boundary of the work area of the robotic manipulator.

18. The method of claim 17, wherein the rear sensor is a first rear sensor that is mounted to the housing of the AGV, the plurality of laser imaging sensors further including a second rear sensor mounted to the housing of the AGV, the deploying of the virtual safety fence further including the first and second rear sensors together deploying a planar rear boundary of the work area of the robotic manipulator.

19. The method of claim 18, wherein the plurality of laser imaging sensors further includes a left sensor and a right sensor each mounted to the housing of the AGV, the deploying of the virtual safety fence further including:
the left sensor deploying a planar left boundary of the work area of the robotic manipulator; and
the right sensor deploying a planar right boundary of the work area of the robotic manipulator.

20. The method of claim 19, further comprising:
one of the front sensors or one of the rear sensors sensing that a storage rack is disposed on the left or right side of the work area of the robotic manipulator; and
muting one or more of the respective left sensor and the right sensor, so that the work area of the robotic manipulator is bounded by the storage rack instead of the respective planar left boundary or the planar right boundary.

21. The method of claim 19, wherein the planar front boundary, the planar rear boundary, the planar left boundary, and the planar right boundary together form a complete perimeter of the work area of the robotic manipulator.

* * * * *